United States Patent [19]

Evans et al.

[11] Patent Number: 4,548,466
[45] Date of Patent: Oct. 22, 1985

[54] OPTICAL FIBRE COUPLING ASSEMBLIES

[76] Inventors: Dain S. Evans, 4 Upper Sales, Chaulden, Hemel Hempstead, Hertfordshire, England; George A. Georgiou, 45 Oakwood Ave., London, England, N.14; Peter Mossman, 'Thistles', Cokes La., Chalfont St.Giles, Buckinghamshire, England; Arabinda Mukherjee, 11 Culver Grove, Stanmore, Middlesex, England; John B. Whiscombe, 19 Sutherland Rd., Ealing, London, England, W.13

[21] Appl. No.: 536,997

[22] Filed: Sep. 29, 1983

[30] Foreign Application Priority Data

Sep. 29, 1982 [GB] United Kingdom ............... 8227799

[51] Int. Cl.⁴ .................................................. G02B 7/26
[52] U.S. Cl. .................................. 350/96.20; 350/320; 357/74
[58] Field of Search ............... 350/96.15, 96.17, 96.20, 350/96.21, 96.18, 320; 357/17, 19, 30, 74, 81; 250/227

[56] References Cited

U.S. PATENT DOCUMENTS

| 4,119,363 | 10/1978 | Camlibel et al. | 350/96.20 |
| 4,167,744 | 9/1979 | Nyul | 357/17 |
| 4,291,942 | 9/1981 | Henry et al. | 350/96.20 |
| 4,296,998 | 10/1981 | Dufft | 350/96.20 |
| 4,357,072 | 11/1982 | Goodfellow et al. | 350/96.20 |
| 4,456,334 | 6/1984 | Henry et al. | 350/320 |

FOREIGN PATENT DOCUMENTS

| 2923490 | 12/1980 | Fed. Rep. of Germany | 350/96.20 |
| 54-163046 | 12/1979 | Japan | |
| 56-113110 | 9/1981 | Japan | 350/96.20 |
| 2064862 | 6/1981 | United Kingdom | 350/96.20 |

Primary Examiner—John Lee
Attorney, Agent, or Firm—Kirschstein, Kirschstein, Ottinger & Israel

[57] ABSTRACT

A coupling between an optical fibre (1) and an optoelectronic device e.g. a semiconductor laser (2) is located within a hermetically sealed housing (3,6). The device is supported on a header (14) mounted on the front wall (3) of the housing, the lead (16) to the device passes through the housing wall via a glass-to-metal seal (17,19,20), and the fibre is soldered into a ferrule (10) which is inserted through a boss (4) on the front housing wall. After alignment of the fibre with the device, the ferrule is clamped in position by two parallel sets of screws (11(a), 11(b)) inserted through the boss, and is then soldered to the boss. The housing, header, ferrule and metal component(s) of the glass-to-metal seal are all formed of the same metal, preferably gold-plated copper, to avoid differential expansion.

20 Claims, 2 Drawing Figures

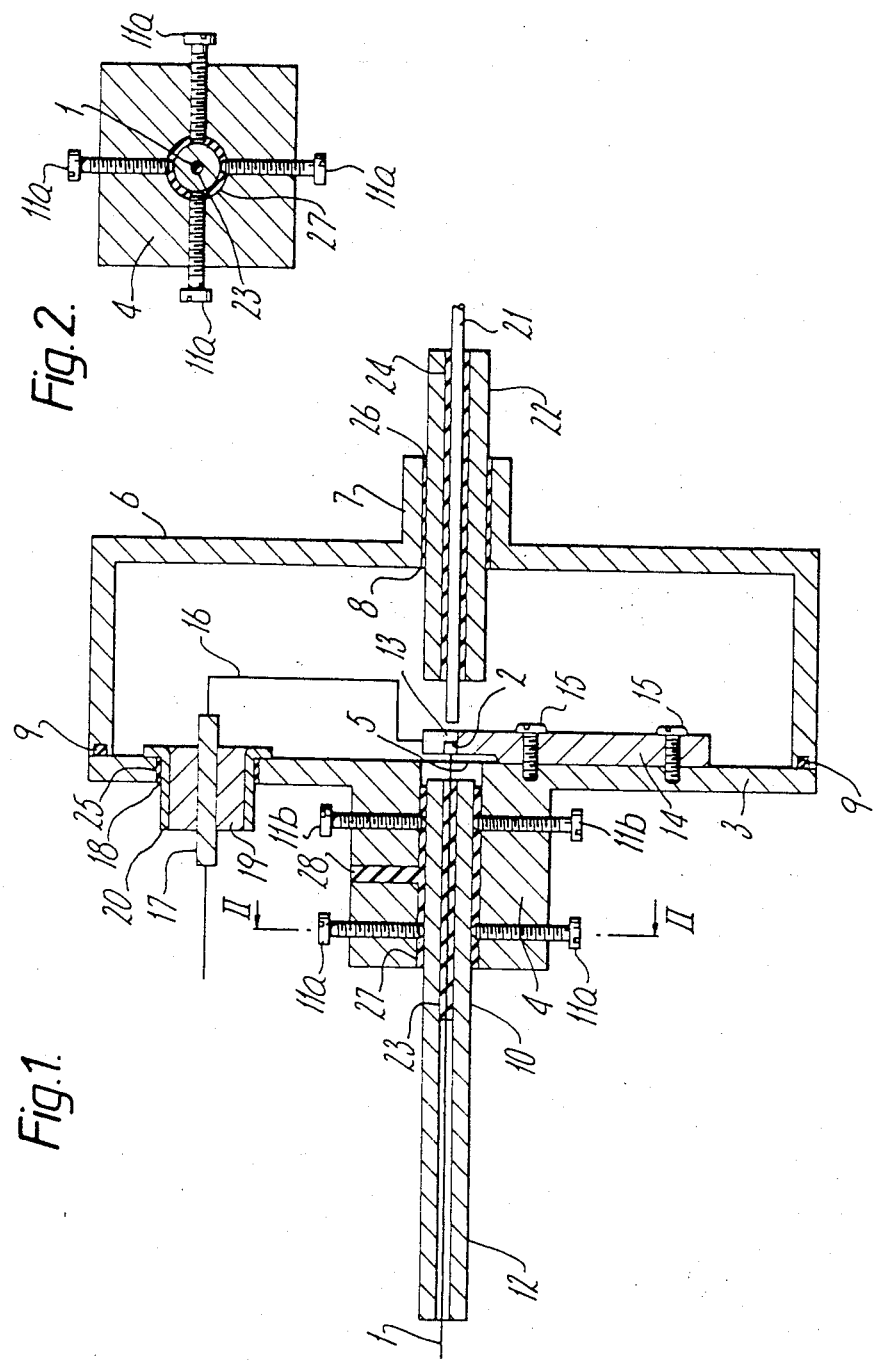

OPTICAL FIBRE COUPLING ASSEMBLIES

This invention relates to an optical coupling assembly in which an optical fibre is coupled to an opto-electronic device, for example a light source such as a semiconductor junction laser or a light emitting diode, or a light receiving device such as a photodiode, and wherein the interface between the optical fibre and the opto-electronic device is located in an enclosed space. The invention also relates to methods of manufacturing the assembly described.

It is an essential requirement, in an optical coupling assembly of the kind referred to, that the optical fibre and the opto-electronic device are accurately and fixedly aligned in both radial and axial directions, particularly high precision of alignment being required in the case of a monomode optical fibre; moreover, such alignment should be maintained constant over a range of ambient temperatures, for example $-20°$ C. to $+60°$ C. It is further required that the space in which the interface between the fibre and the device is situated is hermetically sealed against the ingress of moisture or dust.

It is an object of the present invention to provide an improved assembly incorporating an enclosed coupling between an optical fibre and an opto-electronic device, in which assembly the above-mentioned requirements are met, and which is especially, but not exclusively, suitable for so coupling a monomode fibre to a said device.

Accordingly the invention provides, an optical coupling assembly comprising a metal housing forming an enclosure and having a front wall provided with an aperture and an integral external boss formed around the aperture, which boss has a central bore extending from the said aperture orthogonally to the front wall, an opto-electronic device located within the housing adjacent to the centre of the said aperture, mounted on a metal header attached to the interior surface of the front wall, and connected to an electrically conducting lead which is extended through the housing wall by means of a glass-to-metal seal, a metal ferrule inserted coaxially within the bore of the boss, an optical fibre located along the axis of the ferrule, with the end of the fibre in contact with the said device, and two sets of screws inserted through the wall of the boss at two locations spaced apart longitudinally with respect to the boss, for adjusting the radial and angular position of the ferrule within the boss to align the optical fibre with the said device, and for clamping the ferrule in position, each said set consisting of at least three screws spaced apart around the circumference of the boss, the furrule being soldered to the interior surface of the boss wall, the optical fibre being hermetically sealed into the ferrule, and at least the front wall of the housing, the device-supporting header, and the ferrule all being formed of the same metal.

The optical fibre is preferably sealed into the ferrule by means of solder, the fibre first being coated with metal, suitably gold, either by thermal decomposition of an organo-metallic compound, or with nickel-chromium-gold by conventional vapour phase deposition techniques. Precision jigging facilities are employed to position the fibre centrally along the axis of the ferrule, in order to minimise differential expansion effects.

When the opto-electronic device mounted within the housing is a semiconductor junction laser, light receiving means, for example a photodiode or an optical fibre, is sealed into an aperture in the black wall, for monitoring the light output of the laser in use of the assembly. The monitoring means is connected to means for automatically adjusting and stabilising the output of the laser in response to variations in the light received by the monitor.

The glass-to-metal seal by means of which the lead to the opto-electronic device is passed through the wall of the housing consists of a metal rod sealed through a glass bead or disc, which is sealed into an additional aperture in the housing wall, preferably the front wall. The glass may be sealed directly to the housing wall around the aperture, but preferably the glass body is surrounded by, and sealed into, a metal sheath which is soldered to the wall, the sheath being formed of the same metal as the rod and the housing. The lead wire connected to the opto-electronic device is soldered to the end of the rod located within the housing, and a further length of lead wire, as required, may be soldered for the external end of the rod.

The uniform metal components of the assembly, namely the housing, header, ferrule, device lead, and metal part or parts of the glass-to-metal seal, are suitably composed of copper, most of the components preferably being gold-plated. The screws inserted into the boss are preferably formed of a metal which is not wetted by the solder used for bonding the ferrule to the boss, and which has thermal expansion characteristics substantially matching those of the metal of the other components. Where the latter are formed of copper, the boss screws are suitably formed of chromium-plated copper or of a stainless steel having the required expansion characteristics.

A preferred method of manufacturing the optical coupling assembly in accordance with the invention includes the steps of sealing the said glass-to-metal seal into the front wall of the housing, attaching the header, with the opto-electronic device mounted thereon, to the interior surface of the front wall of the housing, soldering the lead of the said device to the metal rod component of the glass-to-metal seal, sealing the optical fibre into the ferrule by means of a first solder, inserting the ferrule-fibre assembly into the boss on the front wall of the housing, aligning the fibre with the opto-electronic device and clamping the ferrule in the aligned position by means of the screws inserted through the wall of the boss, soldering the ferrule to the interior surface of the boss wall by means of a second solder having a lower melting point than that of said first solder, and sealing the said cover portion to the front wall of the housing.

A metal-sheathed glass-to-metal seal may be soldered into the housing wall, suitably using the said first solder employed for soldering the optical fibre into the ferrule: the soldering temperature employed is not critical for either of these operations. The header may be fixed to the front wall of the housing by means of screws and/or solder. If solder is used for this step, and for previously sealing the glass-to-metal seal into the housing wall, the solder used for the header should have a lower melting point than that used for the glass-to-metal seal. The soldering of the lead of the opto-electronic device to the metal rod is conveniently effected by means of a soldering iron, the temperature of this operation again being non-critical since it involves only local heating.

A gold-plated optical fibre can be bonded directly to the interior surface of a gold-plated copper ferrule by solder filling the space around the fibre in the interior of the ferrule. Alternatively, the gold-plated fibre may have copper electro-deposited upon it to a sufficient thickness to fill the interior of the ferrule, the fibre so coated is then inserted into the ferrule, and the copper coating is soldered to both ends of the ferrule. In another alternative method of fixing the fibre into a copper ferrule, two or more copper tubes are inserted into the ferrule, the diameters of the tubes being such that the fibre, the innermost tube, the outer tube or tubes and the ferrule all fit closely within one another respectively, then the fibre is inserted through the innermost copper tube and the assembly is soldered at both ends.

For aligning the optical fibre with the opto-electronic device, where the latter is a light source, the light output from the remote end of the fibre, when the light source is operated, is monitored while the position of the ferrule within the boss is adjusted by means of a micromanipulator and/or the boss screws, the attainment of maximum light output indicating correct positioning of the ferrule and fibre. Where the opto-electronic device is a photodiode, alignment is effected in a similar manner by passing light through the fibre and monitoring the resulting electrical output of the photodiode.

The cover portion and front wall of the housing may be sealed together by soldering. Preferably this step and the step of soldering the ferrule to the interior surface of the boss wall are carried out simultaneously, the said second solder being employed for both operations. If the housing components are soldered together subsequently to the soldering of the ferrule into the boss, the solder employed for joining the housing components must have a lower melting point than that of the said second solder. Alternatively, the housing components may be joined by spot welding or pressure welding.

When it is required to incorporate a light-receiving monitor into the back wall of the housing, this is sealed into the aperture in the back wall before the cover is sealed to the front wall of the housing. If the monitor employed is a photodiode, it may be sealed into the wall by spot welding or by soldering at a temperature sufficiently low to avoid damaging the photodiode. An optical fibre monitor is first soldered into a ferrule, suitably using said first solder, and the ferrule is then soldered into a boss extending from the back wall in a similar manner to the front wall boss, using a solder of lower melting point than that employed for soldering the monitor fibre into its ferrule.

The use of solder for bonding together all the external components of the assembly, including its use for the optical fibre-to-ferrule and ferrule-to-boss joints, is advantageous in that it ensures that the coupling between the optical fibre and the opto-electronic device is hermetically sealed within the housing. As indicated above, a cascade soldering process is used in the construction of the assembly, that is to say successive soldering steps in the assembling of the various components together are carried out at successively lower temperatures, so that each step is effected without risk of damage to the soldered joints formed in previous steps.

A further advantage of the assembly of the invention is that, since all the metal parts, with the exception of the ferrule-clamping screws inserted into the boss, are constructed of the same metal, the whole assembly can be heated as required for soldering operations, with no risk of differential expansion of the components. Furthermore, since the optical fibre and the opto-electronic device are both mounted on the front wall of the housing, and since the housing, ferrule and device header are all formed of the same metal, the correct alignment between the fibre and the device is maintained under all operating conditions, over a wide range of ambient temperatures.

The screws provided in the front wall boss have the advantage that they clamp the ferrule firmly in position while the solder used for bonding the ferrule to the boss is solidifying and cooling, thus preventing any distortion of the ferrule-boss assembly which might otherwise ensue. If, as is preferred, the screws are not wetted by the solder, they can, if required, be used after soldering for minor adjustment of the position of the ferrule, and hence of the fibre, by deformation of the solder.

A specific form of optical coupling assembly in accordance with the invention, and its manufacture, will now be described by way of example with reference to the accompanying schematic drawings, in which, FIG. 1 shows the assembly in sectional elevation, and FIG. 2 is a section drawn on the line II—II of FIG. 1.

The assembly shown in the drawings constitutes a hermetically sealed coupling between a monomode optical fibre 1 and a semiconductor junction laser 2.

Referring to FIG. 1 of the drawings, the assembly housing consists of a front wall portion 3 with an outwardly extending boss 4 formed around an aperture 5, and a cover 6 with an outwardly extending boss 7 formed around an aperture 8 in the back wall. The housing is suitably of rectangular cross-section (but could be circular), and is entirely formed of gold-plated copper; the front wall and cover are soldered together at 9.

The optical fibre 1 is soldered into a gold-plated copper ferrule 10, which is itself soldered into the bore of boss 4 and is clamped by two parallel sets of four screws each, 11a and 11b, inserted through the boss 4: one set of screws, 11a, is shown in FIG. 2. The screws are composed, for example, of 18% chromium-8% nickel stainless steel (British Standard Specification EN58B). The ferrule 10 has an elongated integral extension 12, for use in the fibre alignment procedure as will be described below. The fibre 1 extends beyond the inner end of the ferrule 10 through the aperture 5, so as to be coupled with the laser 2, which is located substantially opposite to the centre of the aperture 5 and is mounted in a recess 13 at the upper end of a gold-plated copper header 14 which is attached to the front wall 3 of the housing by copper screws 15. The laser is provided with a copper wire lead 16 the ends of which are soldered respectively to the header 14 and to a gold-plated copper rod 17, which is sealed into an aperture 18 in the front housing wall 3 by means of a glass-to-metal seal structure consisting of the rod 17, a glass bead 19, and a gold-plated copper sheath 20 soldered to the housing wall.

For monitoring the laser output in operation of the assembly, a multimode optical fibre 21 having a large numerical aperture, for example 0.2, is sealed through the boss 7 on the back wall of the housing. The fibre 21 is sealed into a gold-plated copper ferrule 22, which is soldered into the boss 7 in such a position that the end of the fibre 21 is located as close as possible to the laser 2. For operation, the remote end of the fibre 21 is coupled to a photodiode (not shown in the drawings) which is connected to means (not shown) for adjusting the laser output in response to the intensity of the light received by the photo-diode via the fibre 21.

In manufacture of the assembly described above with reference to the drawings, the front housing wall assembly is first completed by soldering the glass-to-metal seal into the aperture 18, and screwing the header 14, to which the laser 2 and lead wire 16 have previously been attached, to the inside of the front wall; the lead 16 is then soldered to the rod 17 with a soldering iron. Portions of the optical fibres 1 and 21 which have been gold-plated, after removal of the protective resin coatings from these portions, are soldered into the respective ferrules 10 and 22, by any one of the three methods described above: the solders 23 and 24 employed for these operations, and the solder 25 used for the glass-to-metal seal, may be of the same composition, for example a eutectic silver-tin solder melting nominally at 221° C. being suitable, the soldering operations being carried out at 230° C.

The ferrule 22 is then sealed into the boss 7 by means of a solder 26 having a lower melting point than the solder 23/24/25: a suitable solder consists of the lead-tin eutectic melting nominally at 130° C.: the soldering operation is carried out at 180° C.

The ferrule 10 is then inserted into the boss 4 so that the tip of the fibre 1 comes into contact with the laser 2, and the fibre is aligned with the laser junction by means of a micro-manipulator (not shown) on the stage of which the end of the ferrule extension 12 is supported for this purpose, the light output from the remote end of the fibre being monitored until a maximum is attained. The ferrule 10 is then clamped in position by the screws 11a and 11b. The clamped ferrule is soldered to the interior surface of the boss 4 by solder 27, the liquid solder being introduced through a hole 28 in the boss, and at the same time the housing cover 6 is soldered to the front wall 3 by means of a pre-formed gasket of solder 9, of the same composition as solder 27. These operations are carried out at a lower temperature than any of the preceding soldering operations, for example at 100° C. using a solder composed of 42.5% bismuth, 37.7% lead, 11.3% tin and 8.5% cadmium, by weight, melting nominally at 87° C.

The assembly construction specifically described above may be modified, if desired, by locating the glass-to-metal seal on the opposite side of the boss 4 from the position shown in FIG. 1, adjacent to the header 14, thus enabling the housing to be reduced in size.

We claim:

1. An optical assembly comprising a metal housing forming an enclosure and having a front wall provided with an aperture and an intergral external boss formed around the aperture, which boss has a central bore extending from the said aperture orthogonally to the front wall, an opto-electronic device located within the housing adjacent to the centre of the said aperture, mounted on a metal header attached to the interior surface of the front wall, and connected to an electrically conducting lead which is extended through the housing wall by means of a glass-to-metal seal, a metal ferrule inserted coaxially within the bore of the boss, an optical fibre located along the axis of the ferrule, with the end of the fibre in contact with the said device, and two sets of screws inserted through the wall of the boss at two locations spaced apart longitudinally with respect to the boss, for adjusting the radial and angular position of the ferrule within the boss to align the optical fibre with the said device, and for clamping the ferrule in position, each said set consisting of at least three screws spaced apart around the circumference of the boss, the ferrule being soldered to the interior surface of the boss wall, the optical fibre being hermetically sealed into the ferrule, and at least the front wall of the housing, the device supporting header and the ferrule all being formed of the same metal.

2. An optical coupling assembly according to claim 1 wherein the metal component of the glass-to-metal-seal and the lead from the component to said device are also formed of the same metal as the front wall of the housing.

3. An optical coupling assembly according to claim 1 wherein the housing incorporates a cover secured to the front wall and having a back wall substantially parallel to the front wall.

4. An optical coupling assembly according to claim 1 wherein the screws of each set are spaced equally around the circumference of the boss.

5. An optical coupling assembly according to claim 1 wherein the part of the optical fibre which is located within the ferrule is coated with metal, suitably gold or nickel-chromium-gold, and is sealed into the ferrule by a solder.

6. An optical coupling assembly according to claim 1 wherein the opto-electronic device is a semiconductor junction laser.

7. An optical coupling assembly according to claim 6 in which the housing has a back wall substantially parallel to the front wall and a light receiving means sealed into an aperture in said back wall, for monitoring the light output of the laser in use of the assembly.

8. An optical coupling assembly according to claim 7 wherein the monitoring means is coupled to means for automatically adjusting and stablilising the output of the laser in response to variations in the light received by the monitoring means.

9. An optical coupling assembly according to claim 1 wherein the glass-to-metal seal consists of a metal rod sealed through a glass bead or disc, which is sealed into an additional aperture in the housing wall.

10. An optical coupling assembly according to claim 9 wherein the glass bead or disc is surrounded by, and sealed into, a metal sheath which is soldered to the wall, the sheath and rod being formed of the same metal as the housing and the lead from the opto-electronic device being soldered to the end of the rod located within the housing.

11. An optical coupling assembly according to claim 1 wherein the housing, header, ferrule, device lead, and metal component(s) of the glass-to-metal seal are composed of copper.

12. An optical coupling assembly according to claim 1 wherein the screws are formed of a metal not wetted by the solder, and having thermal expansion characteristics substantially matching those of the metal of the other parts of the assembly.

13. A method of manufacturing the optical coupling assembly according to claim 1 the method including the steps of sealing the said glass-to-metal seal into the wall of the housing, attaching the header, with the opto-electronic device mounted thereon, to the front wall of the housing, soldering the lead of the said device to the metal component of the said glass-to-metal seal, sealing the optical fibre into the ferrule by means of a first solder, inserting the ferrule-fibre assembly into the boss on the front wall of the housing, aligning the fibre with the opto-electronic device and clamping the ferrule in the aligned position by means of the screws inserted through the wall of the boss, soldering the ferrule to the interior surface of the boss wall by means of a second solder having a lower melting point than that of the said first solder, and sealing a cover portion to the front wall of the housing to form an enclosure.

14. A method of manufacturing the optical coupling assembly according to claim 13 wherein the glass-to-metal seal is metal-sheathed and soldered into the housing wall using the said first solder.

15. A method of manufacturing the optical coupling assembly according to claim 13 wherein the header is soldered to the front wall of the housing, this solder having a lower melting point than that used for soldering the glass-to-metal seal if the said seal is soldered.

16. A method of manufacturing the optical coupling assembly according to claim 13 wherein the cover portion is sealed to the front wall of the housing by soldering using the said second solder at the same time as soldering the ferrule into the boss.

17. A method of manufacturing the optical coupling assembly according to claim 13 wherein the cover portion is sealed to the front wall of the housing subsequently to the soldering of the ferrule into the boss and using a solder with a melting point lower than that of said second solder.

18. A method of manufacturing the optical coupling assembly according to claim 13 in which the housing has a back wall and further including the step of sealing a light-receiving means into an aperture in said back wall before the cover is sealed to the front wall of the housing.

19. A method of manufacturing the optical coupling assembly according to claim 18 wherein the said means is a photodiode and is sealed into the aperture in the back wall of the housing by spot welding.

20. A method of manufacturing the optical coupling assembly according to claim 18 wherein the said means is an optical fibre which is first soldered into a ferrule using said first solder and the ferrule is then soldered into a boss extending from the back wall in a similar manner to the front wall boss using a solder having a melting point lower than that of the said first solder.

* * * * *